(12) United States Patent
Lim et al.

(10) Patent No.: US 10,057,042 B2
(45) Date of Patent: Aug. 21, 2018

(54) METHOD FOR CONTROLLING MEDIUM ACCESS IN FULL-DUPLEX WI-FI NETWORK

(71) Applicant: GWANGJU INSTITUTE OF SCIENCE AND TECHNOLOGY, Gwangju (KR)

(72) Inventors: Hyuk Lim, Gwangju (KR); Wooyeol Choi, Gwangju (KR)

(73) Assignee: GWANGJU INSTITUTE OF SCIENCE AND TECHNOLOGY, Gwangju (KR)

( * ) Notice: Subject to any disclaimer, the term of this patent is extended or adjusted under 35 U.S.C. 154(b) by 170 days.

(21) Appl. No.: 15/065,804

(22) Filed: Mar. 9, 2016

(65) Prior Publication Data

US 2016/0277160 A1    Sep. 22, 2016

(30) Foreign Application Priority Data

Mar. 20, 2015  (KR) .......................... 10-2015-0038874

(51) Int. Cl.

| H04L 5/00 | (2006.01) |
|---|---|
| H04W 28/02 | (2009.01) |
| H04L 5/14 | (2006.01) |
| H04L 1/00 | (2006.01) |
| H04W 52/24 | (2009.01) |

(Continued)

(52) U.S. Cl.
CPC .............. *H04L 5/006* (2013.01); *H04L 1/00* (2013.01); *H04L 5/14* (2013.01); *H04W 24/00* (2013.01); *H04W 52/241* (2013.01); *H04W 52/46* (2013.01); *H04L 5/0055* (2013.01); *H04W 28/12* (2013.01); *H04W 52/243* (2013.01);

(Continued)

(58) Field of Classification Search
None
See application file for complete search history.

(56) References Cited

U.S. PATENT DOCUMENTS

| 9,743,417 | B2 * | 8/2017 | Ibrahim | ............... | H04W 72/082 |
| 2007/0116106 | A1 * | 5/2007 | Hart | ...................... | H04W 52/24 |
| | | | | | 375/227 |

(Continued)

OTHER PUBLICATIONS

Zhou et al; "RCTC: Rapid Concurrent Transmission Coordination in Full Duplex Wireless Networks"; 2013; IEEE; pp. 1-10.*

(Continued)

*Primary Examiner* — Robert C. Scheibel
(74) *Attorney, Agent, or Firm* — Hauptman Ham, LLP

(57) ABSTRACT

The present invention includes: defining a transmission signal generated by the AP and a transmitter (TX) configured to transmit a signal to the AP and reception signals generated by the AP and receivers (RXs) configured to receive a signal from the AP, and canceling self-interference in consideration of a channel gain of the self-interference at the AP; defining a channel transmitted from the TX to the AP as uplink, defining a channel transmitted from the AP to the RX as downlink, and deriving a signal-to-interference-plus-noise ratio (SINR) for a signal transmittable on the uplink and the downlink; selecting an RX capable of maximizing a capacity sum of transmit powers of the AP and the TX; and selecting optimum transmit powers of the AP and the TX for maximizing SINRs of transmission on the uplink and the downlink.

19 Claims, 16 Drawing Sheets

(51) Int. Cl.
    *H04W 52/46*    (2009.01)
    *H04W 24/00*    (2009.01)
    *H04W 72/00*    (2009.01)
    *H04W 74/00*    (2009.01)
    *H04W 88/04*    (2009.01)
    *H04W 28/12*    (2009.01)

(52) U.S. Cl.
    CPC .......... *H04W 52/245* (2013.01); *H04W 72/00* (2013.01); *H04W 74/00* (2013.01); *H04W 88/04* (2013.01)

(56) References Cited

U.S. PATENT DOCUMENTS

| | | | |
|---|---|---|---|
| 2009/0017752 A1* | 1/2009 | Lee | H04B 7/15592 455/9 |
| 2009/0252051 A1* | 10/2009 | Yu | H04L 5/0032 370/252 |
| 2011/0149769 A1* | 6/2011 | Nagaraja | H04W 52/12 370/252 |
| 2014/0287678 A1* | 9/2014 | Fujio | H04B 7/15535 455/10 |

OTHER PUBLICATIONS

Ramirez et al; "Optimal Routing and Power Allocation for Wireless Networks with Imperfect Full-Duplex Nodes"; Sep. 2013; IEEE Transactions on Wireless Communications; vol. 12, No. 9, pp. 4692-4704.*

[Supportive Materials for Exception to Loss of Novelty] Power-Controlled Medium Access Control Protocol for Full-Duplex WiFi Networks on Mar. 3, 2015, 15 pages.

* cited by examiner

Position of RX

RSS at RX for the signals from AP and TX

FIG. 4a

| Frame Control | Duration ID | Receiver Address | Transmitter Address | FCS |
|---|---|---|---|---|
| 2 | 2 | 6 | 6 | 4 |

Bytes (a) RTS

| Frame Control | Duration ID | Receiver Address | Candidate Address 1 | Candidate Address 2 | FCS |
|---|---|---|---|---|---|
| 2 | 2 | 6 | 6 | 6 | 4 |

Bytes (b) CTS-Uplink (CTS-U)

| Frame Control | Duration ID | Receiver Address | Transmitter Address | Interference | FCS |
|---|---|---|---|---|---|
| 2 | 2 | 6 | 6 | 2 | 4 |

Bytes (c) CTS-Downlink (CTS-D)

| Frame Control | Duration ID | Receiver Address | ACK | FCS |
|---|---|---|---|---|
| 2 | 2 | 6 | 1 bit | 4 |

Bytes (d) ACK-Uplink (ACK-U)

| Frame Control | Duration ID | Receiver Address | FCS |
|---|---|---|---|
| 2 | 2 | 6 | 4 |

Bytes (e) ACK-Downlink (ACK-D)

FIG. 4b

| Frame Control | Duration ID | Receiver Address | Transmit Power | Frame Body |
|---|---|---|---|---|
| 2 | 2 | 6 | 2 | |

Bytes (a) Header of AP (HA)

| Frame Control | Duration ID | Receiver Address | Frame Body |
|---|---|---|---|
| 2 | 2 | 6 | |

Bytes (b) Header of client (HC)

FIG. 12

| | | Position of RX | | | |
|---|---|---|---|---|---|
| | | A | B | C | D |
| Distance | TX ↔ AP | 8.1 m | 8.1 m | 8.1 m | 8.1 m |
| | AP ↔ RX | 6.2 m | 5.5 m | 6.2 m | 8.1 m |
| | TX ↔ RX | 3.0 m | 6.0 m | 9.0 m | 12.0 m |
| w/o power control | $SINR_{Uplink}$ | 13.9 dB | 13.5 dB | 13.4 dB | 13.5 dB |
| | $SINR_{Downlink}$ | -10.0 dB | -8.1 dB | -4.8 dB | -1.4 dB |
| | FD possibility | × | × | × | × |
| PoCMAC | $SINR_{Uplink}$ | 1.9 dB | 6.0 dB | 7.2 dB | 9.2 dB |
| | $SINR_{Downlink}$ | -0.2 dB | 6.1 dB | 7.5 dB | 8.9 dB |
| | FD possibility | × | ◎ | ◎ | ◎ |

Changes of received powers for uplink and downlink transmissions by PoCMAC

CDF of inter-client interference

METHOD FOR CONTROLLING MEDIUM ACCESS IN FULL-DUPLEX WI-FI NETWORK

CROSS-REFERENCE TO RELATED APPLICATIONS

This application claims the priority of Korean Patent Application No. KR 10-2015-0038874 filed on Mar. 20, 2015, in the Korean Intellectual Property Office, the disclosure of which is incorporated herein by reference.

BACKGROUND

1. Technical Field

The present invention relates to a method for controlling medium access in a full-duplex Wi-Fi network, and more particular, to a control method for minimizing interference at an access point (AP) using a full-duplex scheme such that clients have high transfer rates.

2. Description of the Related Art

In a cellular system, a relay is used between a base station and a terminal in order to improve frequency efficiency and to expand coverage. Examples of the relay include an optical repeater and a wireless relay. Recently, research has been widely conducted on wireless relays as the wireless relays take a lower installation cost than the optical repeater and are not restricted to specific installation areas. The wireless relay receives a radio signal through a receive antenna and retransmits the same through a transmit antenna. The schemes for operation of the wireless relay are broadly divided into half-duplex and full-duplex.

A relay adopting half duplex performs transmission and reception using two orthogonal channels in the time domain or the frequency domain. Accordingly, a transmitted signal does not cause interference to a reception entity. On the other hand, a relay adopting the full-duplex scheme performs transmission or reception simultaneously. Accordingly the full duplex relay obtains high frequency efficiency, but the full-duplex deal relay is difficult to physically implement because of interference caused by a transmitted signal.

In order to implement a wireless relay adopting the full-duplex scheme, various methods for canceling interference signals have been proposed. A typical method is to cancel interference signals by processing a radio frequency signal received through a receive antenna or by converting an intermediate frequency signal into a digital signal and performing digital signal processing.

However, the conventional methods take a long time to perform processing for cancellation of interference signals, and accordingly a delay time at the relay increases. Further, when a transmit antenna is at a very long distance from a receive antenna, network installation is spatially restricted, and accordingly there is a need for a full-duplex protocol capable of excluding interference without such restriction.

BRIEF SUMMARY

It is an aspect of the present invention to provide a wireless network protocol capable of obtaining the maximum performance gain in the full duplex scheme by excluding interference signals generated when communication between an access point (AP) and a client is performed in a Wi-Fi type network environment.

In accordance with one aspect of the present invention, a method for controlling medium access to cancel interference occurring at an access point (AP) of a full-duplex scheme for relaying a radio frequency signal in a Wi-Fi network environment may include defining a transmission signal generated by the AP and a transmitter (TX) configured to transmit a signal to the AP and reception signals generated by the AP and receivers (RXs) configured to receive a signal from the AP, and canceling self-interference in consideration of a channel gain of the self-interference at the AP; defining a channel transmitted from the TX to the AP as uplink, defining a channel transmitted from the AP to the RX as downlink, and deriving a signal-to-interference-plus-noise ratio (SINR) for a signal transmittable on the uplink and the downlink; selecting an RX capable of maximizing a capacity sum of transmit powers of the AP and the TX; and selecting optimum transmit powers of the AP and the TX for maximizing SINRs of transmission on the uplink and the downlink.

According to embodiments of the present invention, self-interference and inter-client interference may be excluded from the full-duplex communication system. Thereby, communication performance may be optimized in the wireless network environment.

BRIEF DESCRIPTION OF THE DRAWINGS

FIG. 4a is a diagram illustrating control frames in a frame structure of the power controlled medium access (PoCMAC) in a full-duplex network according to an embodiment, and FIG. 4b is a diagram illustrating data frame headers.

FIG. 12 illustrates changes of SINRs of uplink transmission and downlink transmission according to positions of the RX in FIG. 11 in a comparison manner.

DETAILED DESCRIPTION

Hereinafter, embodiments of the present invention will be described in detail with reference to the accompanying drawings. It should be understood that the present invention is not limited to the following embodiments, and that the embodiments are provided for illustrative purposes only. The scope of the invention should be defined only by the accompanying claims and equivalents thereof.

Hereinafter, embodiments of the present invention will be described in detail with reference to the accompanying drawings. It should be understood that the present invention is not limited to the following embodiments, and that the embodiments are provided for illustrative purposes only. The scope of the invention should be defined only by the accompanying claims and equivalents thereof.

An access point (AP) may be provided with a signal processing module for canceling self-interference and the precise antenna technology, and full-duplex type mobile clients may be deployed at the AP. Thereby, the AP may transmit and receive signals simultaneously in a wireless network environment employing a full-duplex scheme, and the clients may also transmit and receive signals simultaneously.

In an embodiment, a transmitter (TX) refers to a constituent through which a client transmits a signal from an AP, and a receiver (RX) refers to a constituent for which the client receives the signal from the AP.

Figure 1:
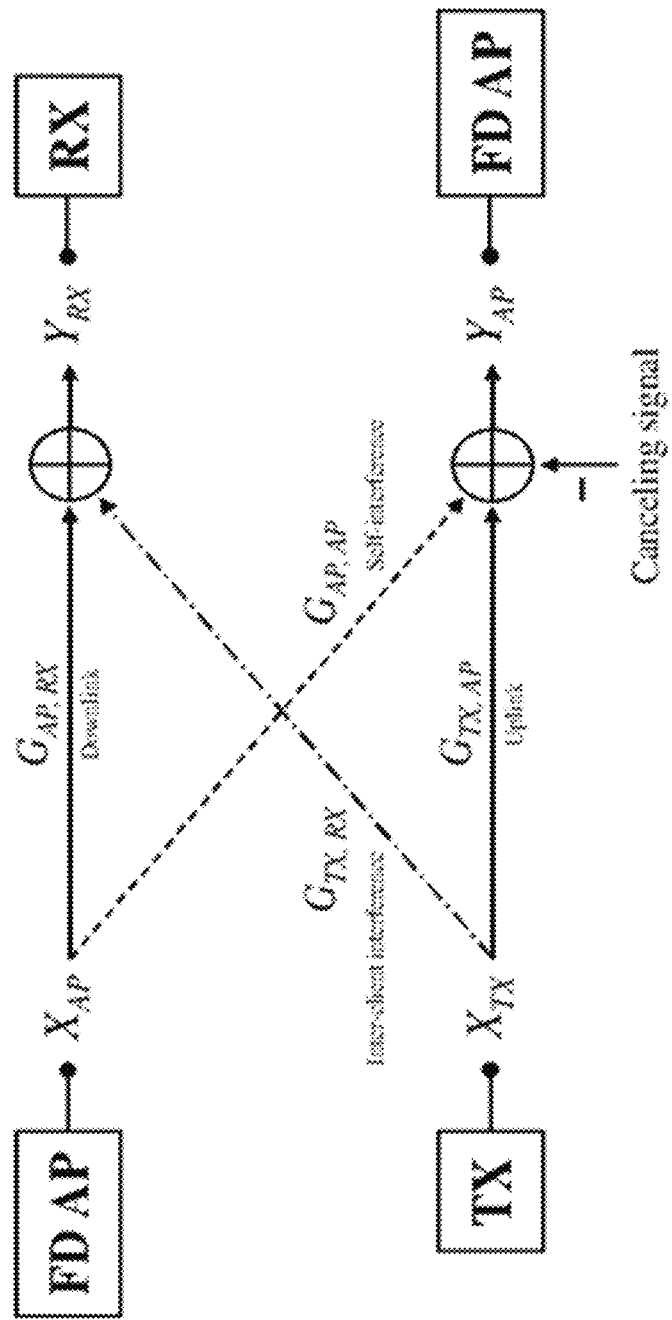
FIG. 1 is a diagram illustrating a system of full-duplex communication according to an embodiment.

FIG. 1 is a diagram illustrating a system of full-duplex communication according to an embodiment.

FIG. 1 shows a wireless network system including one AP, one TX and one RX which are configured according to the full-duplex scheme. The AP may include two constituents including a transmitted signal and a received signal. The AP and the TX which are configured according to the full-duplex scheme have $X_{AP}$ and $X_{TX}$ as transmitted signals, while the RX and the AP which are configured according to the full-duplex scheme have $Y_{RX}$ and $Y_{AP}$ as received signals. In addition, $G_{i,j}$ is defined as a channel gain for an i-th and j-th components, and $G_{AP,AP}$ is defined as a channel gain those of a difference at the AP of the full-duplex scheme.

Signal cancellation for a self-interference cancellation at the full-duplex AP may be expressed as $\tau \cdot \hat{G}_{AP,AP} \cdot X_{AP}$. Herein, $\tau$ denotes a cancellation coefficient for self-interference cancellation, and $\hat{G}_{AP,AP}$ denotes channel estimation of $G_{AP,AP}$. The full-duplex AP may eliminate a difference between SF-interference signal and a cancellation signal by adjusting the value of $\tau$. The received signals $Y_{RX}$ and $Y_{AP}$ may be expressed by the following equation.

$$Y_{RX}=G_{AP,RX} \cdot X_{AP}+G_{TX,RX} \cdot X_{TX}+N_{RX},$$

$$Y_{AP}=G_{TX,AP} \cdot X_{TX}+G_{AP,AP} \cdot X_{AP}-\tau \cdot \hat{G}_{AP,AP} \cdot X_{AP}+N_{AP}, \quad \text{Equation 1}$$

Herein, $N_{RX}$ and $N_{AP}$ denote Gaussian noises which are independently appear at the RX and the AP. To completely cancel the self-interference, the cancellation signal must have a value equal to $G_{AP,AP} \cdot X_{AP}$. When the value of $X_{AP}$ is determined by the AP, self-interference cancellation may be performed by compensating the gain of $G_{AP,AP}$. If $G_{AP,AP} \cdot X_{AP}-\tau \cdot \hat{G}_{AP,AP} \cdot X_{AP}$ does not yield 0, this means that self-interference cancellation is incomplete. However, if self-interference has a very small value compared to the value of the received signal of the AP, the self-interference is ignorable. Accordingly, the suppression level of self-interference cancellation may be defined as $\alpha$, which may be expressed as $\alpha=(G_{AP,AP})^2/(G_{AP,AP}-\tau \cdot \hat{G}_{AP,AP})^2$.

To succeed in performing uplink transmission and downlink transmission, the minimum value of SINR of $Y_{RX}$ and $Y_{AP}$ may be set to a threshold $\gamma$. When $P_{r,i \to j}$ is defined as power received by the j-th client according to a signal transmitted by the i-th client, $P_{r,SI}$ may be defined as self-interference power at the AP. $P_{r,i \to j}$ and $P_{r,SI}$ may be expressed by the following equation.

$$P_{r,i \to j}=|G_{i,j}|^2 \cdot E(|X_i|^2)=|G_{i,j}|^2 \cdot P_{t,i},$$

$$P_{r,SI}=|G_{i,j}|^2 \cdot E(|X_{AP}|^2)=|G_{AP,AP}|^2 \cdot P_{t,AP}, \quad \text{Equation 2}$$

Herein, $P_{t,i}$ denotes transmit power of the i-th client, SINRs of $Y_{RX}$ and $Y_{AP}$ may be expressed as the following equation.

$$SINR_{RX} = \frac{P_{r,AP \to RX}}{P_{r,TX \to RX} + N_{RX}}, \quad \text{Equation 3}$$

$$SINR_{AP} = \frac{P_{r,TX \to AP}}{\frac{P_{r,SI}}{\alpha} + N_{AP}}.$$

Conditions for successful transmission from the AP to the RX and from the TX to the AP are given by the following equation.

$$SINR_{RX} \geq \gamma,$$

$$SINR_{AP} \geq \gamma. \quad \text{Equation 4}$$

Given Equation 3, a transmission sum rate of a link and downlink which is achievable by the AP is defined by the following equation.

$$R_{sum}=\log_2(1+SINR_{Uplink})+\log_2(1+SINR_{Downlink}),$$
$$\text{(bits/s/Hz)} \quad \text{Equation 5}$$

Herein, $SINR_{Uplink}$ and $SINR_{Downlink}$ denote SINR of uplink transmission and SINR of downlink transmission, and respectively correspond to $SINR_{AP}$ and $SINR_{RX}$ in Equation 3.

Figure 2A:
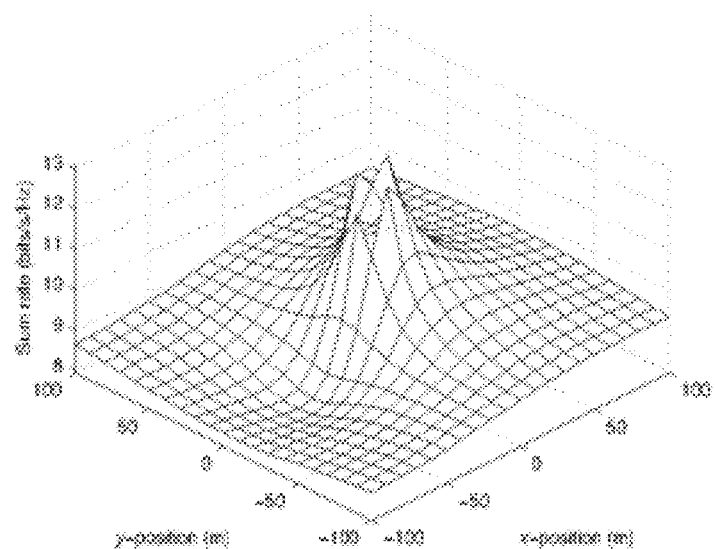
FIG. 2a is a diagram showing the position of the RX and FIG. 2b is a diagram showing the RSS of the RX.
Figure 2B:
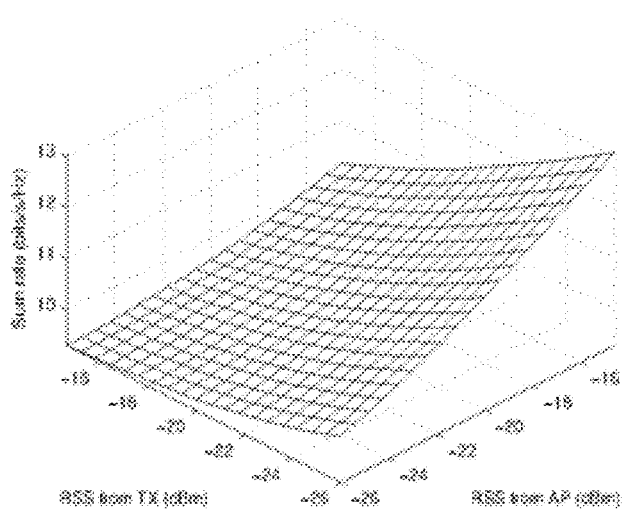

FIG. 2a and FIG. 2b depict a sum rate of a wireless network according to an embodiment. FIG. 2a shows the position of the RX and FIG. 2b shows the RSS of the RX.

Referring to FIG. 2a, the AP and the TX are positioned at (0, 0) and (-50, 0). The sum rate $R_{sum}$ is calculated according to the position of the RX, which is movable within an area of 200*200 m. Referring to FIG. 2b, the range of received signal strength values represents the strength of a receive signal, and when the AP and the TX transmit signals to the RX using initial transmit powers, the RX may be positioned in the all area of 200*200 m. As shown in FIG. 2a, as the distance between the RX and the TX increases and the distance between the RX and the AP decreases, the sum rate $R_{sum}$ tends to increase. When inter-client interference is weak at the TX, and a signal from the AP is strong, a great value of $SINR_{Downlink}$ is yielded at the RX, and $R_{sum}$ increases.

On the other end, if the signal strength from the TX is high, the signal from the TX causes strong inter-client interference at the RX. Thereby, the RX fails to receive the signal from the AP, and $R_{sum}$ decreases.

The example described above represents typical results, and when the AP and the TX serving as transmitters are fixed, the RX should be carefully selected from among multiple clients since the sum rate of the full duplex wireless network changes according to the position of the RX.

Accordingly, in this embodiment, a signal strength-based back-off mechanism for selection of the RX may be used to minimize inter-client interference. In addition, when the AP is performing transmission with maximum transmit power, self-interference at the AP may be amplified by a strong signal transmitted from the AP. Accordingly, if the self-interference signal is not sufficiently prevented, the AP cannot decode a signal from the TX. If the TX is performing transmission with maximum transmit power, the RX is subjected to serious inter-client interference from the TX and thus cannot receive a signal from the AP. This embodiment proposes a method for maximizing the capacity sum of transmit power of the AP and the TX. Full-duplex communication based on power control according to an embodiment is intended to determine the transmit powers of the AP and TX by collecting information about inter-client interference between the TX and the RX and selecting the RX from among the clients.

Hereinafter, description will be given of a received-signal-strength-based (RSSB) contention mechanism for selection of an RX (receiver).

Clients which are to provide data frames to the AP need to transmit RTS frames to the AP first. Before transmitting the RTS frames, all clients need to perform a back-off mechanism to avoid collision therebetween. Each client selects any back-off number within a range between 0 and $CW_{min}$ (an initial contention window size), and attempts to transmit an RTS after waiting for a certain time period.

If two or more clients select the same back-off number, collision occurs between the RTS frames thereof. In this case, the clients perform the back-off mechanism again and double the size of the contention window. This is called a binary exponential back-off mechanism. In the standard of IEEE 802.11, this is used as CSMA/CA (carrier sensing multiple access with collision avoidance) for avoiding collision.

In the full-duplex communication environment, an RX for downlink transmission and a TX for uplink transmission need to be selected. In full-duplex communication, uplink transmission performance and downlink transmission performance are greatly affected by received signal strength (RSS) between the AP and the RX and between the TX and the RX. Accordingly, this embodiment proposes a received-signal-strength-based (RSSB) contention mechanism for selecting an RX for downlink transmission.

In Equation 2, the transmit power from the i-th client to the j-th client is expressed as $P_{r,i \to j} = |G_{i,j}|^2 \cdot P_{t,i}$, and when a control frame is exchanged between the AP and the i-th client, which is one of RX candidates, the i-th client measures receive powers $P_{r,TX \to i}$ and $P_{r,AP \to i}$. For example, the TX transmits an RTS frame to the AP according to a request for transmission. When the AP and RX candidates receive or trace an RTS frame, they may measure transmit power of the RTS frame from the TX. An RSSB contention window for selection of an RX may be derived from $P_{r,TX \to i}$ and $P_{r,AP \to i}$.

$$CW_{RSSB,i} = \left\lfloor \omega_\alpha - \omega_\beta \cdot \log_2\left(1 + \frac{P_{r,AP \to i}}{P_{r,TX \to i}}\right) \right\rfloor \quad \text{Equation 6}$$

Herein, $\omega_\alpha$ and $\omega_\beta$ are constants between $\log_2(1+P_{r,AP \to i}/P_{r,TX \to i})$ and an integer for linear mapping. The value of $\log_2(1+P_{r,AP \to i}/P_{r,TX \to i})$ may vary according to several factors of the wireless network environment.

If the value of $P_{r,AP \to i}/P_{r,TX \to i}$ is high, the i-th client is subjected to a high RSS from the AP, and inter-client interference from the TX is low. Accordingly, the value of $CW_{RSSB,i}$ of the i-th client which provides a high transmission possibility may be used.

Meanwhile, $CW_{RSSB,i}$ decreases as $P_{r,AP \to i}/P_{r,TX \to i}$ increases. Accordingly, a client having a smaller contention window is likelier to access a wireless channel first. As the RSSB contention mechanism for selection of an RX is used, PoCMAC according to an embodiment may designate a client having a high success rate of transmission from the AP and maximizing the full-duplex capacity as a candidate.

Next, a method for determining an RX and transmit power according to the RSSB contention mechanism will be described.

Once an Rx is selected according to the RSSB contention mechanism, the AP calculates the optimum transit powers at the AP and the TX using the power information received from the TX and the RX, inter-client interference from the TX and the RX and self-interference information at the AP. With this method for controlling transmit powers, interference between clients may be attenuated and collision at the RX may be prevented.

As discussed above in Equation 4, SINRs of uplink transmission and downlink transmission should be greater than the threshold γ to implement successful transmission. This condition for successful transmission may be expressed by Equation 6.

$$SINR_{Uplink} = \frac{|G_{TX,AP}|^2 \cdot P_{t,TX}}{\frac{|G_{AP,AP}|^2}{\alpha} \cdot P_{t,AP} + N_{AP}} \geq \gamma, \quad \text{Equation 7}$$

$$SINR_{Downlink} = \frac{|G_{AP,RX}|^2 \cdot P_{t,AP}}{|G_{TX,RX}|^2 \cdot P_{t,TX} + N_{RX}} \geq \gamma.$$

Controlling transmit powers of the AP and the TX has the following effect. Uplink transmission and downlink transmission may be successfully performed at the same time, and have maximum SINR values.

Figure 3:
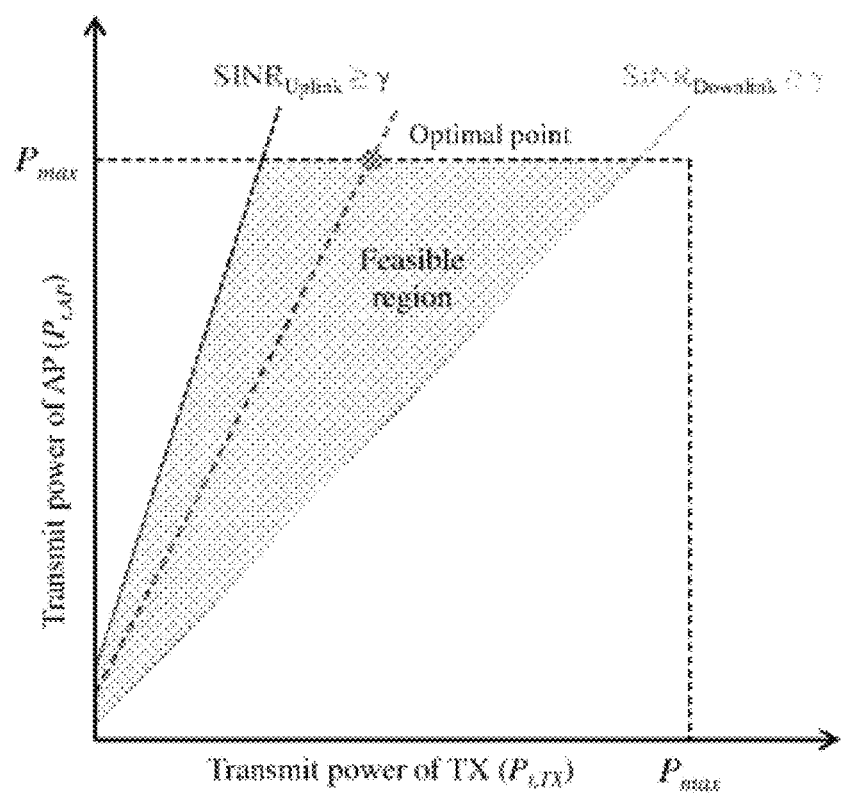
FIG. 3 is a graph depicting an optimal point of transmit powers of an AP and a TX.

FIG. 3 is a graph depicting an optimal point of transmit powers of an AP and a TX. Referring to FIG. 3, the blue line indicates an upper limit for satisfying SINR of uplink, and the green line indicates a lower limit for satisfying SINR of downlink. The shaded portion in gray color represents a feasible region satisfying both SINRs of uplink transmission and downlink transmission. The optimum transmit powers of the AP and the TX for maximizing SINRs of uplink transmission and downlink transmission may be selected in the shaded portion. An equation for determining transmit powers of the AP and the TX may be expressed as follows.

$$P_{t,i}^* = \arg\max_{P_{t,i}}(\min(SINR_{Uplink}, SINR_{Downlink}))$$

$$SINR_{Uplink} \geq \gamma$$

subject to $SINR_{Downlink} \geq \gamma$, for $i \in \{AP,TX\}$.

$$0 \leq P_{t,i} \leq P_{max} \quad \text{Equation 8}$$

To maximize minimum SINR values of uplink transmission and downlink transmission according to restriction to SINR, a linear program including a new factor κ may be used and expressed as follows.

$$P_{t,i}^* = \arg\max_{P_{t,i}} \kappa$$

$$SINR_{Uplink} \geq \kappa$$

subject to $SINR_{Downlink} \geq \kappa$, for $i \in \{AP,TX\}$.

$$\kappa \geq \gamma$$

$$0 \leq P_{t,i} \leq P_{max} \quad \text{Equation 9}$$

An optimal method for maximizing the value of κ is to make the SINR values of uplink and downlink equal each other. Non-uniformity of SINR restriction may be expressed as a function of κ given below $$SINR_{Uplink} = \frac{|G_{TX,AP}|^2 \cdot P_{t,TX}}{\frac{|G_{AP,AP}|^2}{\alpha} \cdot P_{t,AP} + N_{AP}} = \mathcal{K}$$

$$SINR_{Downlink} = \frac{|G_{AP,RX}|^2 \cdot P_{t,AP}}{|G_{TX,RX}|^2 \cdot P_{t,TX} + N_{RX}} = \mathcal{K}$$

Equation 10

Herein, $P_{t,AP}$ and $P_{t,TX}$ denoting transmit powers are yielded in the following equation.

$$P_{t,AP} = \frac{N_{RX}\mathcal{K} \cdot (|G_{TX,AP}|^2 + \mathcal{K} \cdot |G_{TX,RX}|^2)}{|G_{TX,AP}|^2 \cdot |G_{AP,RX}|^2 - \mathcal{K}^2 \cdot |G_{TX,RX}|^2 \cdot \frac{|G_{AP,AP}|^2}{\alpha}},$$

$$P_{t,TX} = \frac{N_{AP}\mathcal{K} \cdot \left(|G_{AP,RX}|^2 + \mathcal{K} \cdot \frac{|G_{AP,AP}|^2}{\alpha}\right)}{|G_{TX,AP}|^2 \cdot |G_{AP,RX}|^2 - \mathcal{K}^2 \cdot |G_{TX,RX}|^2 \cdot \frac{|G_{AP,AP}|^2}{\alpha}}.$$

Equation 11

In Equation 10, $P_{t,AP}$ and $P_{t,TX}$ are given as increasing functions of κ. As the value of κ increases, optimum transmit powers $P^*_{t,AP}$ and $P^*_{t,TX}$ satisfying the range of Equation 9 may be calculated. In FIG. 3, the red line represents points of ($P_{t,TX}$, $P_{t,AP}$) satisfying Equation 10. The optimal point ($P^*_{t,AP}$, $P^*_{t,TX}$) may be calculated by increasing the value of K. That is, the optimum transmit powers may be derived from the linear program for maximizing the values of SINRs of uplink transmission and downlink transmission.

FIGS. 4a and 4b are diagrams illustrating the structure of the power controlled medium access protocol (hereinafter, referred to as PoCMac) in a full-duplex network according to an embodiment. FIG. 4a shows five control frames, and FIG. 4b shows data frame headers.

Referring to FIG. 4a, the control frames include RTS (Request To Send), [CTS (Clear To Send)-Uplink] (CTS-U), [CTS-Downlink] (CTS-D), [ACK-Downlink] (ACK-D) and [ACK-Uplink](ACK-U).

The RTS, ACK-D and HC are identical to those of IEEE 802.11. CTS-U, CTS D ACK-U and HA are new elements introduced in this embodiment and will be described below.

After receiving an RTS frame from a client, the AP transmits a CTS-U frame. The CTS-U frame serves to approve the TX in transmitting uplink data to the AP. In addition, this frame includes a plurality of address fields for transmission of uplink data to the AP as candidate fields. Using the candidate address fields, the AP may recognize proper clients when the AP desires to transmit a data frame. For example, the CTS-U frame may include a Frame Control field, a Duration ID field, a Receiver Address field, a Candidate Address 1 field, a Candidate Address 2 field, and an FCS field, as shown in FIG. 4A.

The CTS-D frame is transmitted by one of candidate clients after the AP transmits the CTS-U frame. After the AP transmits the CTS-U frame, candidate clients designated by the AP performs the RSSB contention mechanism, and a candidate client which wins the RSSB contention transmits a CTS-D frame to the AP. This frame has an address thereof and information about inter-client interference which is receive power of the RTS frame transmitted from the TX. If the RX fails to recognize the RTS frame from the TX and thus fails to measure the signal strength from the TX, 0 will be set in the interference field. For example, the CTS-D frame may include a Frame Control field, a Duration ID field, a Receiver Address field, a Transmitter Address field, an Interference field and an FCS field, as shown in FIG. 4A.

After uplink data is successfully received from the TX, an ACK-U frame is transmitted by the AP. Once the AP successfully receives the uplink data frame, the AP allocates 1 to the ACK-U frame and transmits the frame. Otherwise, the AP allocates 0 to the frame and transmits the frame. The AP transmits the ACK-U frame regardless of whether or not the uplink data frame is successfully received. Thereby, the last information in the transmission period of all clients may be identified. The TX may determine whether or not transmission of the uplink data thereof is successful based on the ACK field of the ACK-U frame transmitted from the AP. In addition, the other clients may determine completion of the transmission period based on the ACK field of the ACK-U frame. For example, the ACK-U frame may include a Frame Control field, a Duration ID field, a Receiver Address field, the ACK field and an FCS field, as shown in FIG. 4A.

Referring to FIG. 4b, the data frame header may include an AP header (HA) and a client header (HC).

The HA frame is a header of a data frame transmitted by the AP. In contrast with the HC frame of a data frame transmitted by a client, the HA frame includes information field for transit power generated when the TX transmits a data frame. For example, the HA frame may include a Frame Control field, a Duration ID field, a Receiver Address field, a Transmit Power field and a Frame Body field, as shown in FIG. 4B. When the AP transmits a data frame to the RX, the TX traces the HA frame of the data frame and derives transmit power calculated by the AP. Then, the TX starts to transmit uplink data thereof to the AP with the indicated transmit power.

Figure 5:
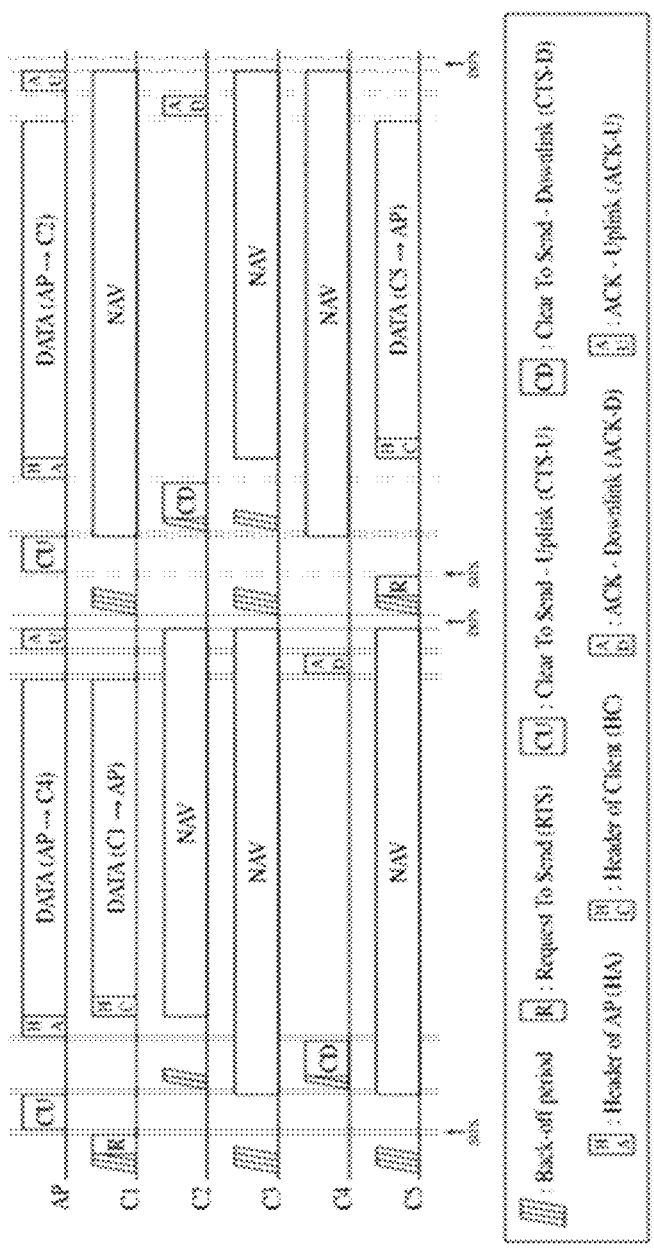
FIG. 5 is a diagram illustrating operation of the PoCMAC protocol according to an embodiment.

FIG. 5 is a diagram illustrating operation of a PoCMAC protocol according to an embodiment. Hereinafter, description will be given of operations of the respective parts with reference to FIG. 5.

[TX Side]

1. All clients desiring to transmit data frames perform the back-off mechanism as defined in IEEE 802.11.

2. A client having obtained an transmission opportunity through the back-off mechanism transmits an RTS frame to the AP using initial transmit power, and then waits for a CTS-U frame to be transmitted from the AP.

3. 1) If the client having transmitted the RTS frame receives a CTS-U frame transmitted from the AP, the client waits for HA of a data frame to be transmitted from the AP, confirming that the client has been selected as the TX.

2) The other clients set network allocation vectors (NAVs) for the corresponding transmission period, and waits until the transmission is completed.

4. After receiving the HA of the data frame, the TX transmits an uplink data frame using the optimum transmit power registered in the HA.

5. Once transmission of the uplink data frame is completed, the TX waits for an ACK-U frame which will be transmitted by the AP.

6.1) After receiving the ACK-U frame, the TX determines that the uplink data frame thereof has been successfully transmitted if the acknowledgment bit in the ACK-U frame is 1 and then returns to the initial state.

2) If the acknowledgment bit in the ACK-U frame is 0, the TX determines that the transmission has failed, and then returns to the initial state to perform retransmission.

[RX Side]
 1. All the other clients which are not selected as the TX trace the RTS frame of the TX, and wait for a CTS-U frame which will be transmitted by the AP.
 2. After all the clients trace this CTS-U frame, the clients check if they are selected as RX candidates through the candidate address information in the CTS-U frame.
 3. 1) If the clients are selected as RX candidates, the clients perform the RSSB contention mechanism.
 2) If a client is not RX candidate, the client sets an NAV and waits until the transmission is terminated.
 4. After RX candidates perform the RSSB contention mechanism, a candidate winning the contention transmits, to the AP, a CTS-D frame containing information about the receive power of the RTS frame transmitted from the TX, namely inter-client interference.
 5. 1) Upon receiving the HA of the data frame transmitted from the AP, the client having transmitted the CTS-D frame checks if the client is selected as the RX, and receives a downlink data frame transmitted from the AP.
 2) The clients which are not selected as the RX set NAVs and wait until the transmission is terminated.
 6. 1) If the downlink data frame is successfully received, the RX transmits an ACK-D frame to the AP.
 2) If reception of the dollar data frame fails, the RX does not transmit the ACK-D frame.
 7. After tracing the ACK-U frame to be transmitted by the AP, the RX returns to the initial state.

[AP Side]
 1. The AP waits for an RTS frame which will be transmitted by a client.
 2. After receiving the RTS frame, the AP selects the client having transmitted the RTS frame as the TX, transmits a CTS-U frame containing the address thereof and addresses of RX candidates to which the AP intends to perform transmission, and waits for a CTS-D frame.
 3. After receiving the CTS-D frame, the AP calculates optimum transit powers that the AP and the TX will use and starts to transmit HA of a data frame using the optimum transmit power thereof.
 4. As the AP starts transmission of the HA, the AP performs self-interference cancellation to stabilize interference and receive an uplink data frame to be transmitted from the TX.
 5. Once the HA transmission is terminated and interference is stabilized, the AP continues to transmit the downlink data frame to the RX, while beginning to receive an uplink data frame transmitted by the TX.
 6. After the uplink and downlink data frames are all transmitted and received, the AP waits for an ACK-D frame which will be transmitted by the RX.
 7. 1) If the AP receives the ACK-D frame, the AP transmits an ACK-U frame, recognizing that the downlink data frame has been successfully transmitted.
 2) Otherwise, the AP transmits the ACK-U frame, determining that transmission of the downlink data frame has failed.
 8. After transmitting the ACK-U frame, the AP returns to the initial state.

In this embodiment, the AP performs downlink data transmission to the RX before uplink data transmission from the TX is performed. This is because the TX needs to recognize optimum transmit power using the HA frame of the downlink data frame before the TX starts uplink data transmission to the AP. In addition, the AP needs to perform self-interference cancellation to invalidate self-interference caused by a transmitted signal. Once the AP starts downlink data transmission, a gain of self-interference may be accurately derived on the assumption that there is no other signal. Thereby, interference cancellation may be performed, and a noise level may be stabilized along with cancellation of self-interference.

If the uplink data frame has the same length as the downlink data frame, uplink transmission and downlink transmission are not completed simultaneously due to delay of uplink transmission. If the uplink transmission is delayed by a time of transmission of the HC frame, the delay time is about 2 µs when the data transfer rate is 54 Mbps. This delay time is shorter than the time of a short inter-frame space (SIFS), and thus collision is not caused by transmission of an AD frame.

Figure 6:
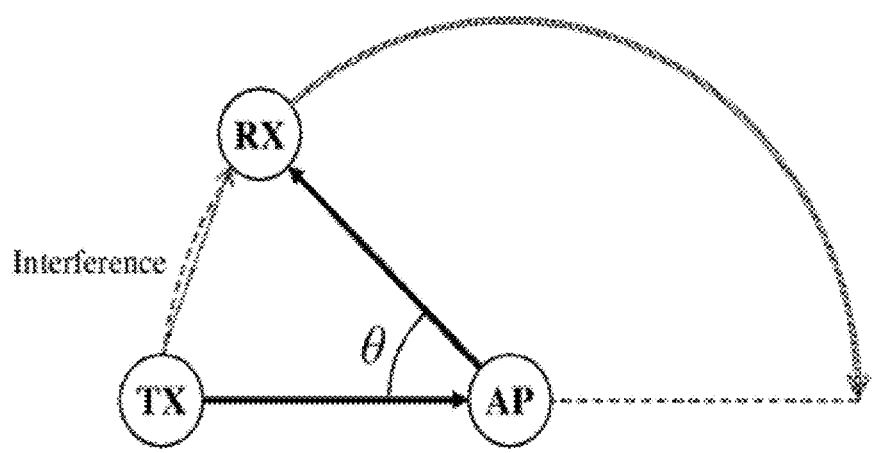
FIG. 6 is a diagram illustrating a network scenario in which the distance between TX and RX varies according to an embodiment.

FIG. 6 is a diagram illustrating a network scenario in which the distance between TX and RX varies according to an embodiment. To analyze influence of inter-client interference between the TX and the RX, SINRs of uplink transmission and downlink transmission at the AP have been simulated by changing the distance between the TX and the RX. The AP and the TX are fixed, and the TX and the Rx are positioned at places separated from the AP by 100 m. The TX and the RX are positioned at the same distance from the AP, only the RX can move along the semicircular around the AP, and the angle between the TX and the RX changes. In this case, only one TX and only one RX are present, and the RSSB contention mechanism cannot be used. Accordingly, selecting an RX need not be performed.

Figure 7:
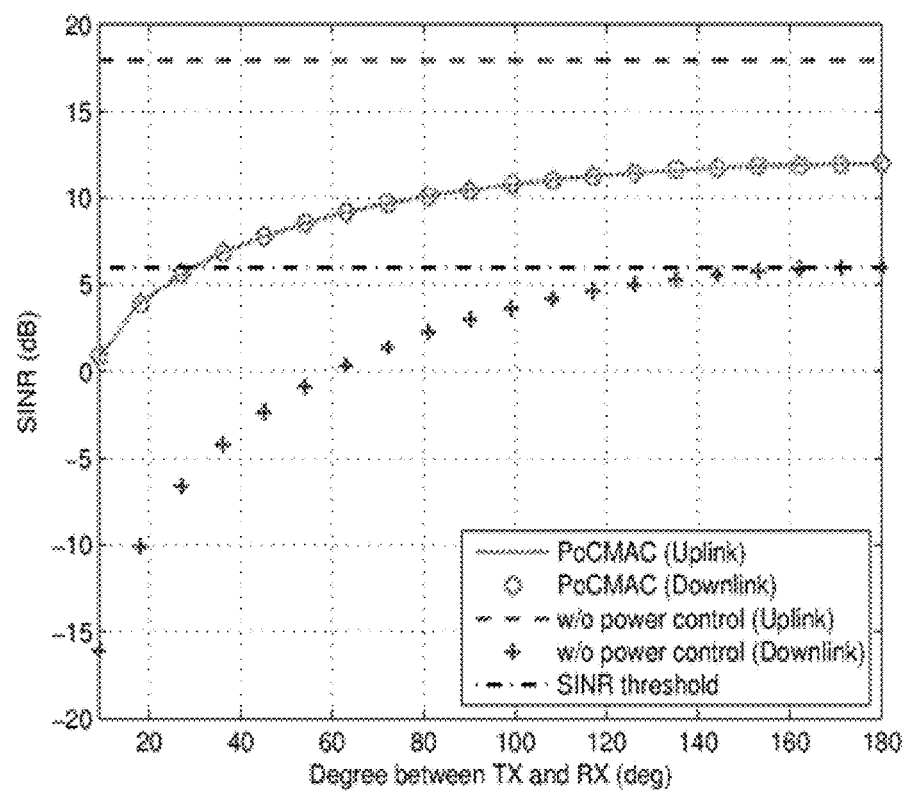
FIG. 7 is a graph depicting SINRs of uplink transmission and downlink transmission according to a suppression level of self-interference cancellation when the angle between TX and RX is 90 degrees.

FIG. 7 is a graph depicting SINRs of uplink transmission and downlink transmission according to a suppression level of self-interference cancellation when the angle between TX and RX is 90 degrees. In this figure, the suppression level of self-interference cancellation is 70 dB. In a full-duplex scheme in which power control is not performed, the SINR of uplink transmission does not change when the distance between the TX and RX changes. This means that the SINR of uplink transmission is not affected by the position of the RX. On the other hand, the SINR of downlink transmission increases as the distance between the TX and the Rx increases. However, if an SINR threshold is required to receive transmitted data, the RX cannot receive downlink transmission at all positions due to low downlink SINR values. That is, in the full-duplex scheme in which power control is not performed, full-duplex capacity cannot be used.

As shown in FIG. 7, in this embodiment, SINRs of uplink transmission and downlink transmission according to PoC-MAC increase as the distance between the TX and the RX increases. Except the case where the distance between the TX and the Rx is very short, inter-client interference caused by the TX and the RX decreases SINRs of uplink transmission and downlink transmission and has a low value. However, if the SINR of downlink transmission at the RX is less than a threshold, the RX cannot receive data from the AP due to inter-client interference. In this case, according to the PoCMAC, the RX receives a CTS-D frame and then operates through half-duplex communication. In addition, the uplink SINR equals the uplink SINR of the full-duplex scheme without power control during the period.

Figure 8:
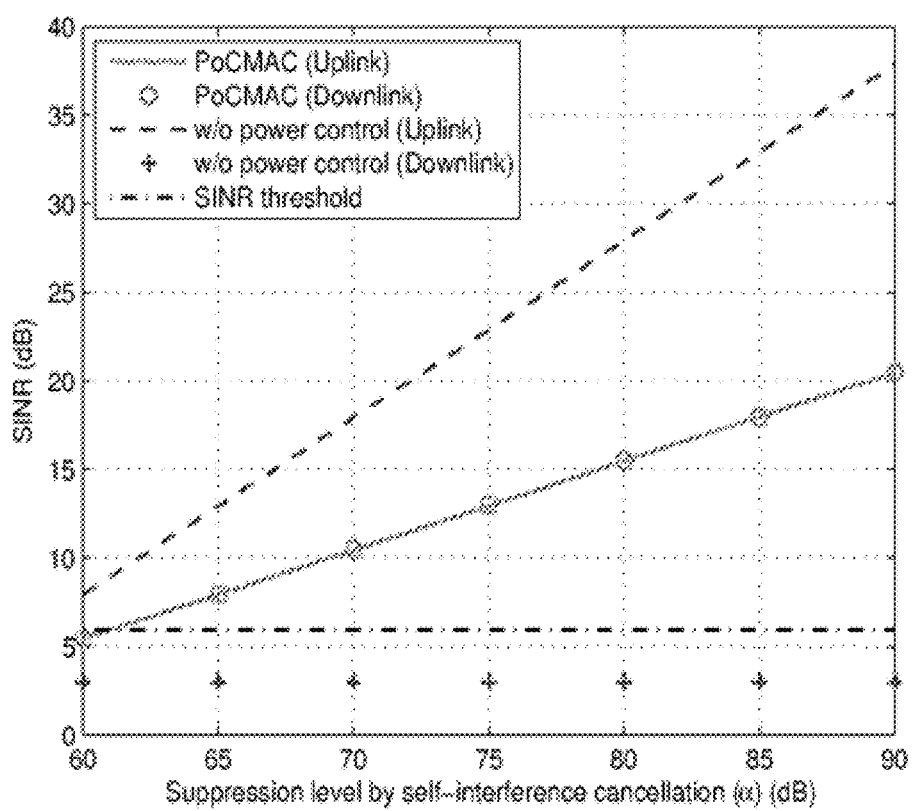
FIG. 8 is a graph depicting SINRs of uplink and downlink according to a suppression level of self-interference cancellation when the angle between TX and RX is 90 degrees.

FIG. 8 is a graph depicting SINRs of uplink and downlink according to a suppression level of self-interference cancellation when the angle between TX and RX is 90 degrees. Referring to FIG. 8, SINRs of uplink transmission and downlink transmission at the AP linearly increase with a slope of α. When the threshold of SINR is 6 dB, uplink transmission and downlink transmission can be performed simultaneously if α is greater than 60 dB. If α is greater than 60 dB, on the other hand, the AP cannot sufficiently suppress self-interference caused by a signal in performing transmission to the RX, and thus the SINR is further deteriorated.

In the full-duplex scheme without power control, SINR of downlink transmission does not change, but SINR of uplink transmission gradually increases as the value of $\alpha$ increases. That is, a high value of $\alpha$ allows the AP to suppress self-interference and increases SINR of uplink transmission. However, without power control, SINR of downlink transmission cannot be increased even with a high value of $\alpha$. This is because full-duplex communication cannot be performed with any value of $\alpha$ when the SINR threshold is 6 dB.

Figure 9:
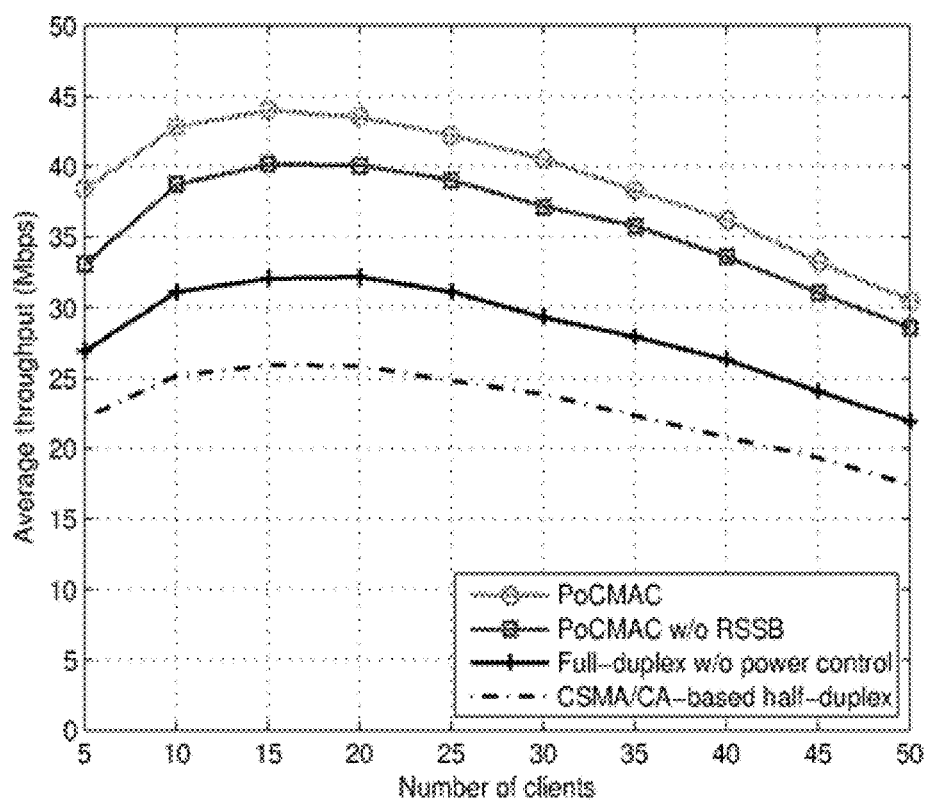
FIG. 9 is a graph depicting average throughput at an AP according to the value of $\alpha$.

FIG. 9 is a graph depicting average throughput at an AP according to the value of $\alpha$. When the CSMA/CA-based half-duplex scheme is used, throughput is not affected by a suppression level of self-interference cancellation, and thus there is no change in the throughput value. On the other hand, the PoCMAC according to an embodiment produces high throughput within the overall range of values of $\alpha$. The throughput is saturated when the value of $\alpha$ is greater than or equal to 65 dB because self-interference is effectively suppressed regardless of transmit power and the position of a client when $\alpha$ is greater than or equal to 65 dB.

The PoCMAC without the RSSB contention mechanism exhibited lower processing performance than when the RSSB contention mechanism is performed, which may be interpreted as meaning that the RSSB contention mechanism contributes to improvement of throughput.

However, in the full-duplex scheme without power control, throughput is not significantly improved compared to the case of the CSMA/CA-based half duplex scheme. When the value of $\alpha$ increases, the SINR value of downlink transmission at the RX does not change, but SINR of uplink transmission from the TX increases. Accordingly, it can be seen from the graph that the SINR at the RX cannot be adjusted to a higher value to successfully perform packet transmission if proper power control is not performed.

As a result of simulation as shown in FIG. 9, the PoCMAC increases throughput by 180% of the throughput in the CSMA/CA-based half duplex scheme and by 145% of the full-duplex scheme without power control.

Figure 10:
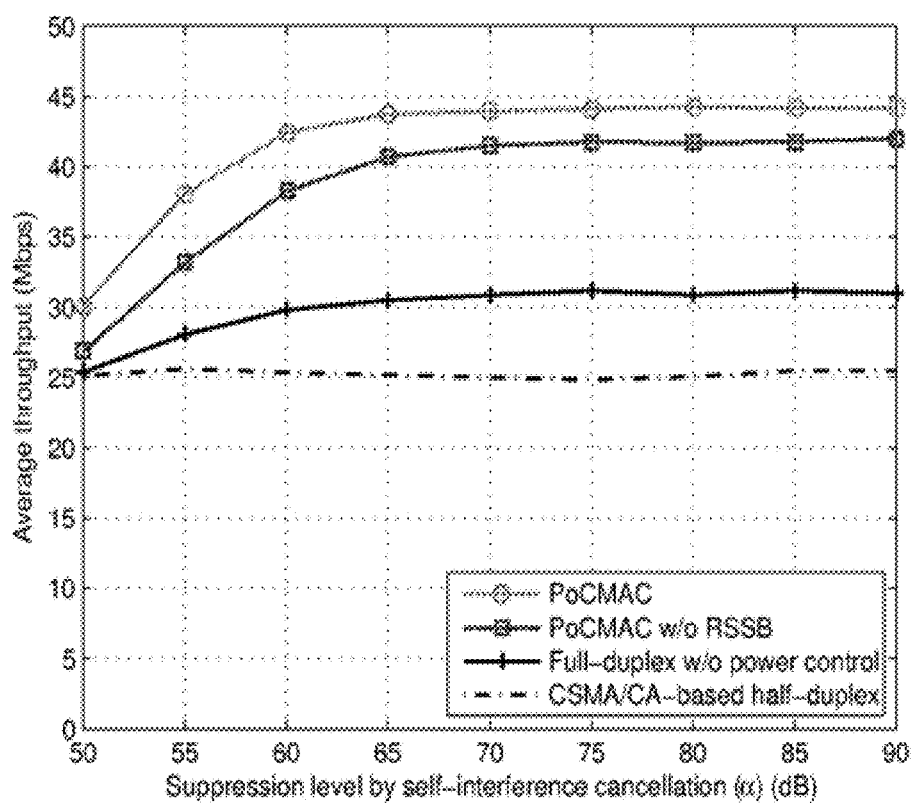
FIG. 10 is a graph depicting average throughput according to the number of clients when $\alpha$ is fixed to 60 dB.

FIG. 10 is a graph depicting average throughput according to the number of clients when $\alpha$ is fixed to 60 dB. Referring to FIG. 10, in all cases, average throughput increases until the number of clients becomes 15. If the number of clients increases beyond 15, throughput performance is degraded in all cases. This is because frequency of collision including the RTS frame increases as the number of clients increases. While average throughput decreases as the number of clients increases, the PoCMAC exhibits the highest throughput in the whole range FIG. 11 is a diagram illustrating exemplary deployment of a TX, an AP and an RX which have been actually fabricated, and FIG. 12 illustrates changes of SINRs of uplink transmission and downlink transmission according to positions of the RX in FIG. 11 in a comparison manner.

Figure 11:
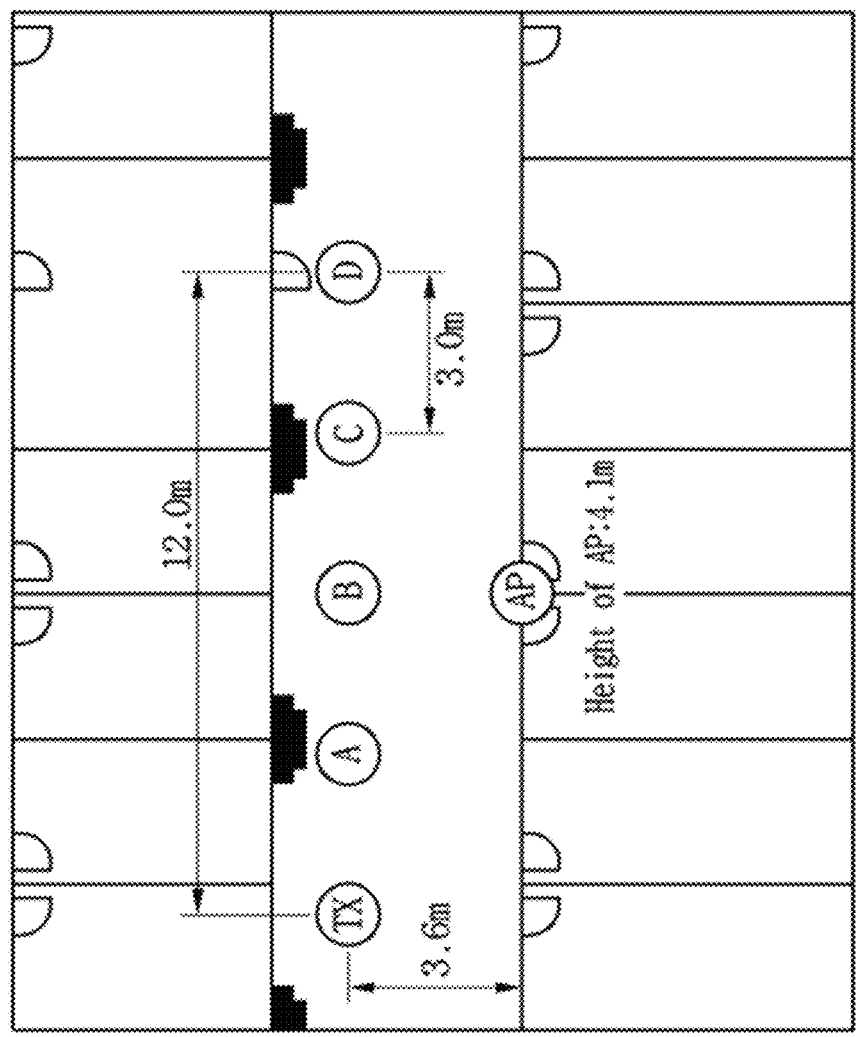
FIG. 11 is a diagram illustrating exemplary deployment of a TX, an AP and an RX which have been actually fabricated.

Referring to FIG. 11, WARP hardware pieces are deployed as shown in the figure to evaluate channel information and SINRs of uplink transmission and downlink transmission. The positions of the AP and the TX are fixed, and the RX is disposed to be movable from A to D. The TX and the RX are disposed on the floor, and the AP is disposed at a height of 4.1 m from the floor. The TX sends a signal for uplink transmission to the AP, and at the same time the AP sends a signal for downlink transmission to the RX. The AP measures SINR of uplink transmission from the TX according to the position of the RX, and the RX measures SINR of downlink transmission from the AP.

FIG. 12 shows results of the PoCMAC according to the embodiment and a case where power control is not performed. In the full-duplex scheme without power control, SINR of uplink transmission does not change according to change of the position of the RX, but SINR of downlink transmission tends to decrease as the RX becomes close to the TX, which means that a signal sent from the TX is gradually subjected to interference caused by downlink transmission from the RX. Accordingly, the full-duplex scheme is not applicable at any position of the RX.

On the other hand, in the case of the PoCMAC according to the embodiment, when the RX moved from B to C to D, inter-client interference caused by the TX was weakened according to transmit power control, while the SINR of downlink transmission increased. In addition, when the RX was positioned at B, C and D, the threshold of SINR satisfies 6 dB and full-duplex communication was possible. When the RX is positioned at A, strong inter-client interference cannot be avoided even if the AP uses the maximum transmit power 5 dBm and the TX uses the minimum power –12 dBm because the TX is excessively close to the RX. By controlling transmit power based on the results described above, a full-duplex gain may be achieved in a geographical region.

Figure 13A:
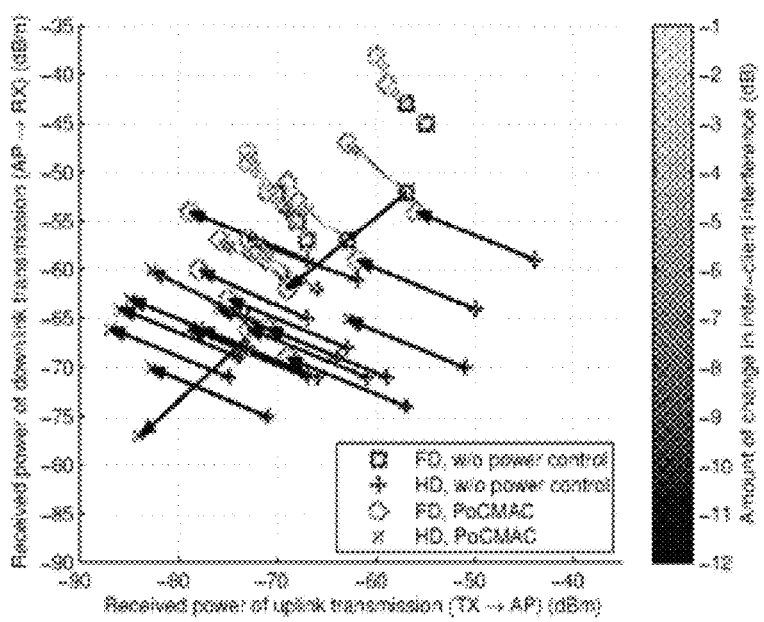
FIG. 13a is a graph depicting change in receive powers of uplink transmission and downlink transmission when PoCMAC is applied according to an embodiment.
Figure 13B:
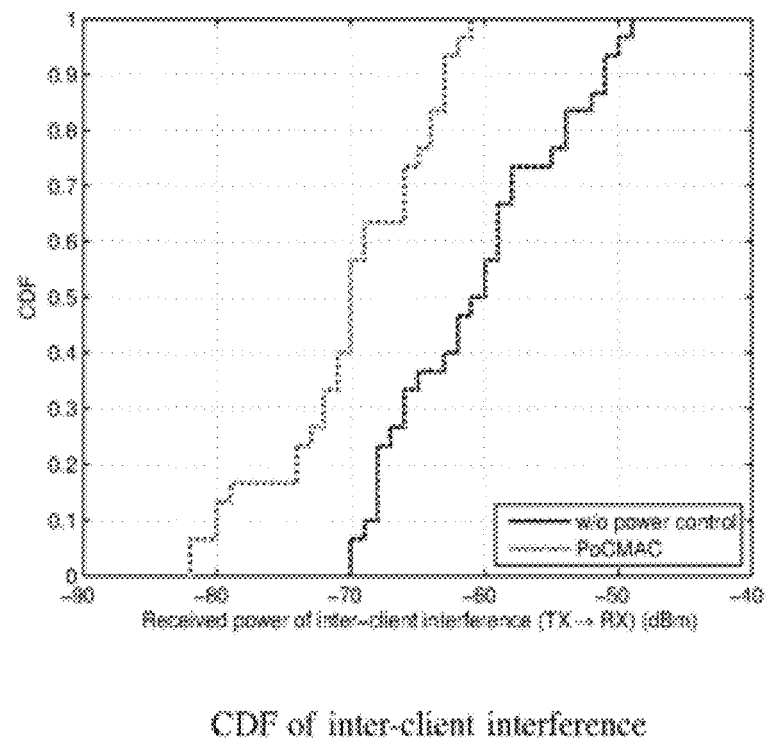
FIG. 13b is a graph depicting receive power of inter-client interference.

FIG. 13a and FIG. 13b show graphs depicting random topology when the TX and the Rx are disposed at 30 positions as another experimental example. FIG. 13a depicts change in receive powers of uplink transmission and downlink transmission when PoCMAC is applied according to an embodiment. As shown in figure, full-duplex communication was possible at 20 positions along the 30 positions when power was controlled according to an embodiment, while full-duplex communication was possible only at eight positions when power was not controlled. This may imply that inter-client interference caused by the TX can be attenuated using the power control method of the embodiment.

FIG. 13b is a graph depicting receive power of inter-client interference. The power control method of the embodiment decreased interference by about 10 dB from the case where power control is not performed. Accordingly, it can be seen from the result of the experiment described above that the embodiment of power control is applicable to any region where full-duplex communication is possible.

Embodiments of the present invention provide a full duplex medium access control protocol under which interference between uplink transmission and downlink transmission at the AP can be reduced and clients can have high transfer rates with low interference. In performing uplink transmission from a client to the AP, a client having a high SINR is highly likely to be selected as a downlink client under the proposed RSSB mechanism despite simultaneous uplink transmission. The embodiments of the present invention provide an optimal solution for maximizing SINRs of uplink transmission and downlink transmission. Thereby, transmit power of the AP and an uplink client may be determined.

Therefore, according to the embodiment, self-interference and inter-client interference may be excluded from the full-duplex communication system, and thus communication performance may be optimized in a wireless network environment.

Exemplary embodiments of the present invention have been described in detail with reference to the accompanying drawings. However, the present invention is not limited to the exemplary embodiments, and modifications and variations can be made thereto without departing from the technical idea of the present invention. For example, specific constituents disclosing the embodiment of the present invention may be changed. It should be understood that such changes and relative application are within the scope of the present invention defined by the company claims.

What is claimed is:

1. A method for controlling medium access in a full-duplex Wi-Fi network, the method comprising:
   transmitting a Clear To Send-Uplink (CTS-U) frame to a transmitter (TX) and receiver (RX) candidates upon receiving a Request To Send (RTS) frame from the TX;
   receiving a Clear To Send-Downlink (CTS-D) frame from a RX that won a contention among the RX candidates;
   calculating an optimum transit power of an access point (AP) and an optimum transit power of the TX using the CTS-D;
   transmitting an AP Header (HA) frame including the optimum transit power of the TX at the optimum transit power of the AP;
   canceling self-interference to receive an uplink data frame from the TX;
   receiving the uplink data frame transmitted from the TX at the optimum transit power of the TX; and
   transmitting a downlink data frame to the RX that won a contention.

2. The method according to claim 1, wherein the canceling self-interference to receive an uplink data frame from the TX comprises:
   canceling self-interference by compensating the channel gain at the AP.

3. The method according to claim 1, wherein the calculating an optimum transit power of an AP and an optimum transit power of the TX using the CTS-D comprises:
   deriving signal-to-interference-plus-noise ratios (SINRs) of the RX and the AP in consideration of transmit powers of clients;
   deriving a threshold of the SINRs for transmission from the AP to the RX and from the TX to the AP; and
   deriving, by the AP, a transmission sum rate of the uplink and the downlink.

4. The method according to claim 3, wherein the deriving of the SINRs of the RX and the AP comprises:
   defining power ($P_{r,i \to j}$) received by a j-th client according to a signal transmitted from an i-th client and self-interference power ($P_{r,SI}$) at the AP; and
   defining transmit power ($P_{t,i}$) of the i-th client,
   wherein the transmit power ($P_{t,i}$) is expressed as the following equation:

$$P_{r,i \to j} = |G_{i,j}|^2 \cdot E(|X_i|^2) = |G_{i,j}|^2 \cdot P_{t,i},$$

$$P_{r,SI} = |G_{i,j}|^2 \cdot E(|X_{AP}|^2) = |G_{AP,AP}|^2 \cdot P_{t,AP},$$ [Equation].

5. The method according to claim 3, wherein the transmission sum rate is derived from the following equation:

$$R_{sum} = \log_2(1 + SINR_{Uplink}) + \log_2(1 + SINR_{Downlink}),$$
(bits/s/Hz) [Equation].

6. The method according to claim 1, wherein the RX that won a contention is determined based on Received Signal Strength Based (RSSB) contention mechanism among the RX candidates.

7. The method according to claim 1, wherein the optimum transit power of an AP and the optimum transit power of the TX are determined in consideration of power information received from the TX and the RX that won a contention, inter-client interference information, and information on self-interference at the AP.

8. The method according to claim 1, further comprising:
   deriving a minimum SINR for transmission on the uplink and the downlink,
   wherein the minimum SINR is set to be greater than a SINR threshold $\gamma$ for transmission from the AP to the RX and from the TX to the AP and is expressed as the following equation:

$$SINR_{Uplink} = \frac{|G_{TX,AP}|^2 \cdot P_{t,TX}}{\frac{|G_{AP,AP}|^2}{\alpha} \cdot P_{t,AP} + N_{AP}} \geq \gamma,$$ [Equation]

$$SINR_{Downlink} = \frac{|G_{AP,RX}|^2 \cdot P_{t,AP}}{|G_{TX,RX}|^2 \cdot P_{t,TX} + N_{RX}} \geq \gamma.$$

9. The method according to claim 1, wherein transmission on the uplink and transmission on the downlink are simultaneously performed,
   wherein the optimum transit power of the AP and the optimum transit power of the TX are determined by the following equation:

$$P_{t,i}^* = \arg \max_{P_{t,i}} (\min(SINR_{Uplink}, SINR_{Downlink}))$$

$$SINR_{Uplink} \geq \gamma$$

subject to $SINR_{Downlink} \geq \gamma$, for $i \in \{AP, TX\}$, $$0 \leq P_{t,i} \leq P_{max}$$ [Equation].

10. The method according to claim 1, wherein a linear program employing $\kappa$ is used to derive maximum SINRs of transmission on the uplink and the downlink, the linear program being expressed as the following creation:

$$P_{t,i}^* = \arg \max_{P_{t,i}} \kappa$$

$$SINR_{Uplink} \geq \kappa$$

subject to $SINR_{Downlink} \geq \kappa$, for $i \in \{AP, TX\}$, $$\kappa \geq \gamma$$

$$0 \leq P_{t,i} \leq P_{max}$$ [Equation].

11. The method according to claim 10, wherein the SINRs of transmission on the uplink and the downlink are set to equal each other to obtain a maximum value of $\kappa$ and are expressed as the following equation:

$$SINR_{Uplink} = \frac{|G_{TX,AP}|^2 \cdot P_{t,TX}}{\frac{|G_{AP,AP}|^2}{\alpha} \cdot P_{t,AP} + N_{AP}} = \mathcal{K}$$ [Equation]

$$SINR_{Downlink} = \frac{|G_{AP,RX}|^2 \cdot P_{t,AP}}{|G_{TX,RX}|^2 \cdot P_{t,TX} + N_{RX}} = \mathcal{K}.$$

12. The method according to claim 11, wherein powers at the AP and the TX are yielded by increasing functions of $\kappa$, and the optimum transmit powers satisfying the SINRs of transmission on the uplink and the downlink are calculated by increasing $\kappa$, wherein the powers at the AP and the TX are expressed as the following equation:

$$P_{t,AP} = \frac{N_{RX} \mathcal{K} \cdot (|G_{TX,AP}|^2 + \mathcal{K} \cdot |G_{TX,RX}|^2)}{|G_{TX,AP}|^2 \cdot |G_{AP,RX}|^2 - \mathcal{K}^2 \cdot |G_{TX,RX}|^2 \cdot \frac{|G_{AP,AP}|^2}{\alpha}} \quad \text{[Equation]} \ 5$$

$$P_{t,TX} = \frac{N_{AP} \mathcal{K} \cdot \left(|G_{AP,RX}|^2 + \mathcal{K} \cdot \frac{|G_{AP,AP}|^2}{\alpha}\right)}{|G_{TX,AP}|^2 \cdot |G_{AP,RX}|^2 - \mathcal{K}^2 \cdot |G_{TX,RX}|^2 \cdot \frac{|G_{AP,AP}|^2}{\alpha}}. \quad 10$$

13. The method according to claim 1, further comprising:
designating a client transmitting the RTS frame as the TX, and designating other clients as the RXs.

14. The method according to claim 1, wherein the CTS-U comprises a Frame Control field, a Duration ID field, a Receiver Address field, a Candidate Address 1 field, a Candidate Address 2 field, and an FCS field.

15. The method according to claim 1, wherein the CTS-D comprises a Frame Control field, a Duration ID field, a Receiver Address field, a Transmitter Address field, an Interference field and an FCS field.

16. The method according to claim 1, wherein the HA frame comprises a Frame Control field, a Duration ID field, a Receiver Address field, a Transmit Power field and a Frame Body field, and
wherein the optimum transit power of the TX is recorded in the Transmit Power field.

17. The method according to claim 1, further comprising:
determining, when the ACK-Downlink (ACK-D) frame is received from the RX that won the contention, that the transmitting of the downlink data frame has been completed, and determining, when the ACK-D frame is not received from the RX that won the contention, that the transmitting of the downlink data frame has failed.

18. The method according to claim 1, further comprising:
transmitting an ACK-Uplink (ACK-U) frame when the receiving of the uplink data frame is completed.

19. The method according to claim 18, wherein the ACK-U frame comprises a Frame Control field, a Duration ID field, a Receiver Address field, an ACK field and an FCS field.

* * * * *